Dec. 15, 1953 P. F. LA ROCHE 2,662,567
HANDSAW FRAME
Filed March 18, 1952 2 Sheets-Sheet 2
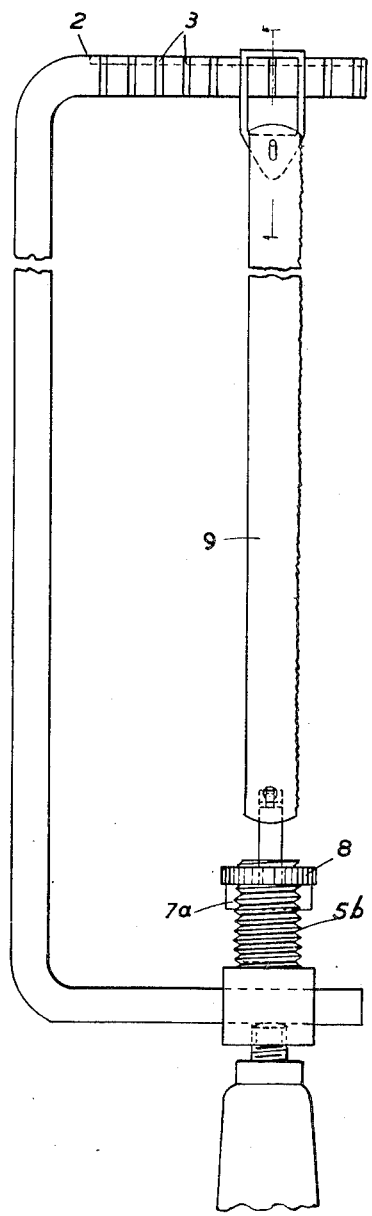
FIG.3.
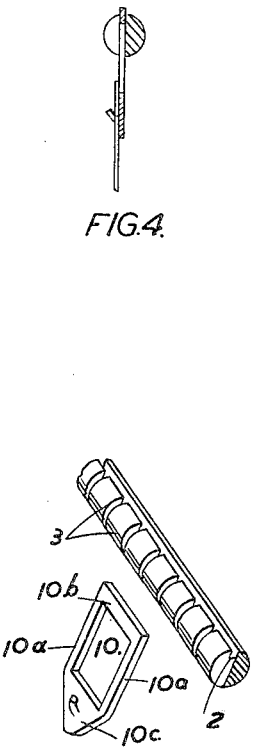
FIG.4.
FIG.5.
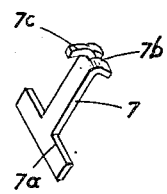
FIG.6.
Inventor
Philip Frank La Roche
By
Pennie, Edmonds, Morton, Barrows and Taylor
Attorneys

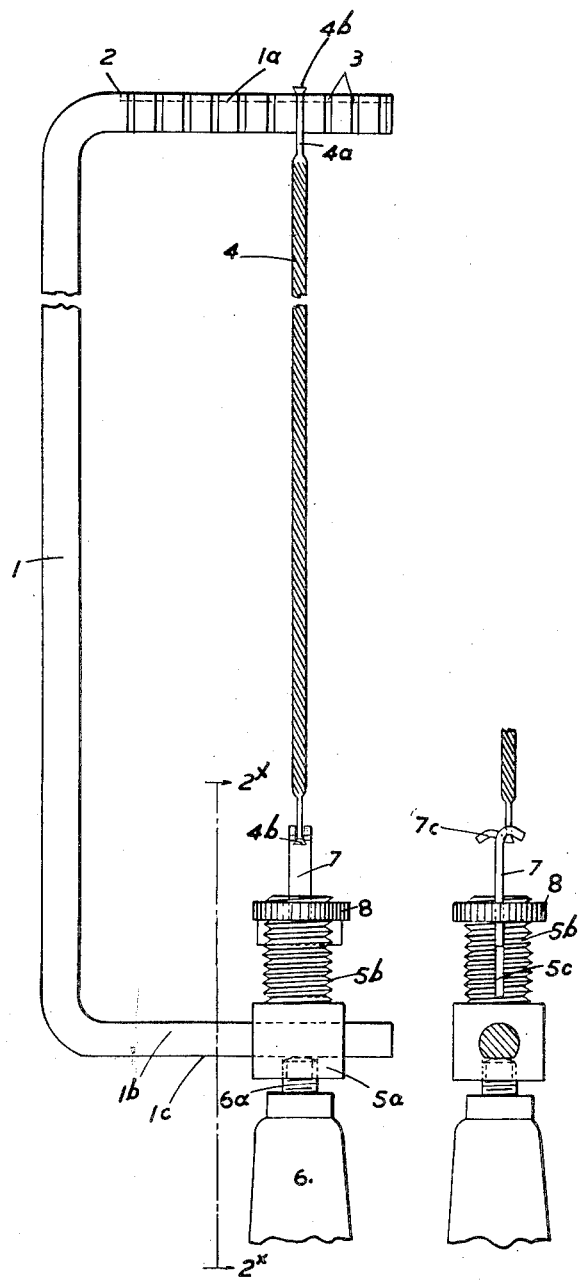

UNITED STATES PATENT OFFICE 2,662,567

HANDSAW FRAME

Philip Frank La Roche, London, England

Application March 18, 1952, Serial No. 277,164

1 Claim. (Cl. 145—35)

This invention relates to hand saw frames and has for its object to provide a construction which will permit the saw frame to be used either with a tension file or with an ordinary hack saw blade.

In accordance with the invention the distal limb of the usual U-shaped saw frame is provided with a series of spaced slots any one of which may receive one end of a tension file and is provided with a longitudinal groove which may receive a saddle piece having limbs to engage a pair of the spaced slots and to form an anchorage for one end of a hack saw blade, while the handle end of the saw frame is provided with a slidable block adapted to be locked in adjusted position by means of a screw engaging the limb and rotatable by the handle while the block has a slotted portion to receive an anchoring and tensioning member for that end of the tension file or saw blade. Preferably the anchoring and tensioning member has a hook shaped end and by simple reversal of its position in the slot may be used either for anchoring that end of a saw blade or of a tension file.

Where the saw frame is used with a tension file the adjustment of the block to which the handle is attached may be used to bring the axis of the tension file into parallelism with the longitudinal member of the saw frame so that the latter may be used as a radius for the purpose of cutting circular holes in a plate by means of the tension file.

In order that the invention may be more readily understood the same is illustrated with reference to the accompanying drawings in which:

Fig. 1 shows the saw frame with the tension file in position;

Fig. 2 is a detail view at right angles to Fig. 1 of the handle and anchoring means taken on the line 2x—2x of Fig. 1;

Fig. 3 is a view similar to Fig. 1 of the saw frame with a hack saw blade in position;

Fig. 4 is a detail at right angles to Fig. 3 of the distal end of the frame showing the saw blade anchorage;

Fig. 5 a perspective view of part of the distal end of the U-shaped frame with a saddle piece (shown detached) for use with a hack saw blade, and Fig. 6 is a perspective view of the anchorage at the handle end of the frame.

Referring to the drawings, the U-shaped frame is of round section rod having a longitudinal portion 1 and limbs 1a, 1b at right angles thereto. The limb 1a has a groove 2 running longitudinally of the outermost surface and a series of parallel slots 3 cut substantially half way through the rod so that each intersects at right angles at one of its ends the longitudinal groove 2. Any of the slots 3 is adapted to receive one end 4a of the usual tension file 4 which is formed with enlargements 4b at each end. The intersection of the groove 2 and the slots 3 form recesses or seats into which the enlargements 4b at one end can be drawn when the tension file is tensioned.

At its other end the limb 1b is provided with a slidable anchoring and tensioning device which comprises a block 5a having an externally screw threaded shank 5b formed with a slot 5c the block 5a having a bore therethrough disposed at right angles to the screw threaded shank. The block 5a also has a screw threaded aperture disposed coaxially of the shank 5b. Into this screw threaded aperture is threaded a spigot 6a which forms an extension of a handle 6. The limb 1b is formed with a plane surface 1c, shown in Fig. 2, which forms a suitable abutment for the end of the spigot 6a.

By slackening the spigot 6a, the block 5 may be slid back and forth along the limb 1b to adjust the distance of that end of the file from the limb 1 of the frame the other end of the file being inserted in that slot 3 in the distal limb to bring the file into parallelism with the limb 1 of the saw frame. The spigot 6a is then tightened by rotating the handle 6 so that the member 5 is locked in its adjusted position. The anchoring and tensioning means for the proximal end of the file consists of a T-shaped plate 7 having substantially the thickness as the width of the slot 5c. The head 7a of the T extends to each side of the slot 5c for engagement with the underside of a nut 8 which is threaded upon the shank 5b. The other end of the tensioning member 7 is incised at 7b and the portions bent over as shown in Fig. 6 to receive the enlargement 4b of the tension file 4. The intermediate portion 7c is bent backwards and downwards to provide the usual pin 7c for passing through the eye of a hack saw blade when a hack saw is to be inserted in the frame as shown in Fig. 3.

When the heads 4b of the tension file have been inserted in their respective slots 3, 7b, the nut 8 on the shank 5b can be screwed down so as to engage with the underside of the head 7a of the T piece 7 so as to tension the file.

For the purpose of using a hack saw blade 9 in the saw frame, an adapter 10 is mounted on the distal limb, such adapter consisting of a saddle piece 10b having a pair of limbs 10a and a solid part 10c having a projection 11 struck out from the solid part to engage with the usual eye of the saw blade 9. The limbs 10a of the saddle piece are spaced apart a distance equal to the spacing of the slots 3 in the limb 1a and the saddle piece 10b is adapted to lie within the groove 2 of the limb 1a. The adapter is thus positively located in position and cannot be moved once the blade has been inserted in the pins 7c and 11 and the adjusting nut 8 of the tensioning device has been tightened.

A large number of positions of adjustment of either the tension file or hack saw blade can be obtained by providing a sufficient number of slots 3.

I claim:

In a hand saw frame including a frame of U-shaped section having distal and proximal limbs, a block adjustable lengthwise on the proximal limb, a handle with a locking means for locking the block in a selected position on the proximal limb, and an anchoring and tensioning means carried by the block for one end of a blade, said distal limb having therein on one side a series of regularly-spaced parallel slots extending at right angles to the axis of the distal limb, the improvement in which said distal limb also includes a longitudinal groove on the outermost face of the limb intersecting said series of slots, an adapter for the distal limb including a saddle piece fitting in said groove and parallel limbs respectively extending from the ends of the saddle piece and respectively engaging in a pair of said spaced slits, and an anchorage means on said adapter for the other end of the blade.

PHILIP FRANK LA ROCHE.

References Cited in the file of this patent

FOREIGN PATENTS

| Number | Country | Date |
|---|---|---|
| 628,680 | Great Britain | Sept. 2, 1949 |